United States Patent [19]
Ito et al.

[11] Patent Number: 5,647,676
[45] Date of Patent: Jul. 15, 1997

[54] DOCUMENT PROCESSING DEVICE HAVING RULING FUNCTION

[75] Inventors: Chitoshi Ito, Kasugai; Kazuhisa Hirono; Akihiko Niwa, both of Nagoya; Sachiko Nakagawa, Kariya, all of Japan

[73] Assignee: Brother Kogyo Kabushiki Kaisha, Nagoya, Japan

[21] Appl. No.: 501,793

[22] Filed: Jul. 13, 1995

[30] Foreign Application Priority Data

Jul. 20, 1994 [JP] Japan .................. 6-191132

[51] Int. Cl.$^6$ ............................ B41J 5/30
[52] U.S. Cl. .................. 400/65; 400/17; 400/76; 400/615.2
[58] Field of Search ............ 400/16, 65, 615.2, 400/586, 70, 76, 17; 395/144, 147

[56] References Cited

U.S. PATENT DOCUMENTS

| | | |
|---|---|---|
| 4,403,301 | 9/1983 | Fessel .................. 400/62 |
| 4,651,288 | 3/1987 | Zeising .................. 400/62 |
| 5,188,469 | 2/1993 | Nagao et al. . |
| 5,222,818 | 6/1993 | Akiyama et al. ............ 400/615.2 |
| 5,473,982 | 12/1995 | Hirata et al. ............ 101/128.4 |

*Primary Examiner*—John S. Hilten
*Attorney, Agent, or Firm*—Oliff & Berridge

[57] ABSTRACT

A document processing device including a keyboard for inputting various data and instructions, a print mechanism for printing on a print medium dot pattern data which are developed in a print data buffer, a memory for storing input data of characters and symbols, and a controller for controlling the keyboard, a display and the print mechanism, a block indication unit for inputting, from the keyboard, block indication data which are indicated as a block for each array of plural characters and symbols at a data input time, and storing the block indication data into the memory with the data of the plural characters and symbols of the block, and a block border ruled line data preparing unit for calculating a block size for each block using the data of the memory, and developing the ruled line data of a rectangular block border into the print data buffer.

22 Claims, 14 Drawing Sheets

| START RULE TYPE SETTING PROCESSING CONTROL | |
|---|---|
| STEP | ACTION |
| S20 | DISPLAY RULE TYPE SELECTION FRAME |
| S21 | RULE TYPE SELECTION PROCESSING |
| S22 | BLOCK BORDER RULE ? |
| S23 | FIRST COMBINATION RULE ? |
| S24 | SECOND COMBINATION RULE ? |
| S25 | OUTER BORDER RULE ? |
| S26 | KD ← 1 |
| S27 | KD ← 2 |
| S28 | KD ← 3 |
| S29 | KD ← 4 |
| S30 | KD ← 0 |
| | RETURN |

FIG. 4B

| START TAPE-SHAPED LABEL FORMING CONTROL | |
|---|---|
| STEP | ACTION |
| S10 | KEY INPUT ? |
| S11 | PRINTABLE KEY INPUT ? |
| S12 | Format SETTING KEY INPUT ? |
| S13 | RULE SETTING KEY INPUT ? |
| S14 | PRINT KEY INPUT ? |
| S15 | PROCESSING CORRESPONDING TO MANIPULATED KEY |
| S16 | DOCUMENT DATA STORAGE AND DISPLAY PROCESSING |
| S17 | Format SETTING PROCESSING |
| S18 | RULE TYPE SETTING PROCESSING |
| S19 | PRINT PROCESSING |

FIG. 5B

| START RULE TYPE SETTING PROCESSING CONTROL | |
|---|---|
| STEP | ACTION |
| S20 | DISPLAY RULE TYPE SELECTION FRAME |
| S21 | RULE TYPE SELECTION PROCESSING |
| S22 | BLOCK BORDER RULE ? |
| S23 | FIRST COMBINATION RULE ? |
| S24 | SECOND COMBINATION RULE ? |
| S25 | OUTER BORDER RULE ? |
| S26 | KD ← 1 |
| S27 | KD ← 2 |
| S28 | KD ← 3 |
| S29 | KD ← 4 |
| S30 | KD ← 0 |
| | RETURN |

FIG. 6B

| STEP | START PRINT PROCESSING CONTROL |
|------|------|
| | ACTION |
| S40 | KD = 0 ? |
| S41 | KD = 4 ? |
| S42 | CM ← LM x 2 |
| S43 | CM ← LM |
| S44 | RULE CALCULATION PROCESSING |
| S45 | CHARACTER ARRAY DOT PATTERN DEVELOPING PROCESSING |
| S46 | OUTPUT DOT PATTERN DATA |
| | RETURN |

FIG. 7B

| STEP | ACTION |
|---|---|
| \multicolumn{2}{c}{START RULE CALCULATION PROCESSING CONTROL} | |
| S50 | BLOCK BORDER RULE CALCULATION |
| S51 | INTERLINEAR BOUNDARY RULE CALCULATION |
| S52 | INTER-CHARACTER BOUNDARY RULE CALCULATION |
| S53 | KD = 4 ? |
| S54 | BLOCK BORDER RULE DATA DEVELOPING PROCESSING |
| S55 | KD = 1 ? |
| S56 | INTERLINEAR BOUNDARY RULE DATA DEVELOPING PROCESSING |
| S57 | KD = 2 ? |
| S58 | INTER-CHARACTER BOUNDARY RULE DATA DEVELOPING PROCESSING |
| S59 | OUTER BORDER RULE DATA DEVELOPING PROCESSING |
| | RETURN | ns
DOCUMENT PROCESSING DEVICE HAVING RULING FUNCTION

BACKGROUND OF THE INVENTION

1. Field of the Invention

The invention relates to a document processing device and, more particularly, to a document processing device which is capable of easily preparing not only the rule data of block border rules (rules are defined as ruled lines in this document) for each block which is specified for each array of plural characters and symbols, but also the rule data of ruled lines for a table such as interlinear boundary rules and inter-character boundary rules within each block border.

2. The Description of Related Art

Each conventional word processor for the Japanese language and the English language basically includes a display on which document data of plural printed text lines can be displayed, a keyboard, and a print mechanism having a print head of a dot print type. The word processor is designed to print document data comprising input characters and symbols on a print sheet according to a preset print format (format information) which contains information such as the print character size, the inter-character pitch, and the interlinear pitch (value).

This type of word processor is ordinarily provided with a ruling (line drawing) function as a standard function. Thus, it can select a desired type rule (ruled line) from various line types, such as a fine line type, a heavy line type, and a dotted line type. In addition, the word processor can prepare a table on a display by setting the size of each column which is provided for table preparation and by manipulating a ruling key and the cursor shift keys in combination on the basis of the size of the column.

Further, there is a word processor which has an automatic table creation function and is capable of automatically preparing even large-size and complicated tables by merely setting the size in the right-and-left direction and the size in the up-and-down direction of a column which is a base for a table creation work, setting the frequency of repetition of the column in each of the lateral and longitudinal directions (i.e., the repetitive number of the base column as described above in each of the lateral and longitudinal directions), indicating a start position for the table preparation, and then manipulating an execution key.

As described above, in the word processor having the ruling function, the size of each column is first determined in advance for a table creation work, and the cursor shift keys are manipulated while manipulating the ruling key on the basis of the size of the column, so that not only the table creation work is complicated, but also a great amount of time is required for the table creation work. Therefore, table creation efficiency is reduced.

Further, in the word processor having the automatic table creation function, when a table is prepared, it is necessary to set the size of a column which is a base for the table creation work and further set the repetition number of the column in the lateral and longitudinal directions by suitably manipulating the keys on the keyboard so that table creation efficiency is reduced like the word processor having the ruling function.

Still further, even when any one of the ruling function and the automatic table creation function is used, a ruling space in which a rule (ruled line) such as a longitudinal rule, a lateral rule or the like is drawn is additionally needed for each rule, so that a table is unintentionally large in size.

SUMMARY OF THE INVENTION

An object of the invention is to provide a document processing device which is capable of easily and precisely drawing rules (ruled lines) of block borders for blocks, each of which is specified for each array of plural characters or symbols, as well as rules for tables, such as interlinear boundary rules and inter-character boundary rules within block borders on the basis of document data.

In order to attain the above object, a document processing device according to the invention includes input means for inputting various data and instructions, print means for printing on a print medium dot pattern data which are developed in a print data buffer, input data storage means for storing input data of characters and symbols, and control means for controlling the input means, display means and the print means, and further including block indication means for inputting, from the input means, block indication data which are indicated as a block for each array of plural characters and symbols at a data input time, and storing the block indication data into input data storing means while being incident to the data of the plural characters and symbols of the block, and block border rule data preparation means for calculating a block size block by block using the data of the input data storing means, and developing the rule data of a rectangular block border into the print data buffer.

The document processing device as described above may further include interlinear rule data preparation means for calculating an interlinear boundary rule which is located between print lines contained in the block and over a gap between right and left longitudinal rules of a block border, and developing the interlinear boundary rule data of the interlinear boundary rule into the print data buffer.

The document processing device as described above may further include inter-character rule data preparation means for calculating an inter-character boundary rule which is located between characters contained in the print lines and over a gap between upper and lower interlinear boundary rules, and developing the inter-character boundary rule data of the inter-character boundary rule into the print data buffer.

Further, when plural blocks are adjacent to one another in the print direction, on the basis of the data stored in the input data storing means and the data of both left and right margins which are preset, the rule data preparation means may prepare the rule data of a rectangular block border containing both the right and left margins.

Still further, when plural blocks are provided to be adjacent to one another in a print direction, on the basis of the data stored in the input data storing means, the data of both the preset right and left margins and the data of an interblock margin, the rule data preparation means may dispose a common longitudinal rule of two adjacent block borders at the center of the interblock margin in the print direction, and prepare the rule data of the block border so that the margins provided at both the right and left end portions of each block are identical with each other.

According to the document processing device as described above, the input data storing means is stored with the data of the input characters and symbols, and the block indication means is input with block indication data which are indicated as a block for every array of plural characters and symbols, and stores the block indication data into input data storing means while being incident to the data of the plural characters and symbols of the block. The block border rule data preparation means calculates the block size for every block using the data of the input data storing means and develops the rule data of a rectangular block border into the print data buffer. The print means prints the block border rule data on a print medium in addition to the dot pattern data of the characters and symbols which are developed in the print data buffer.

As described above, using the data of the characters and symbols which are stored in the input data storing means and the block indication data, the size of the block is calculated for every block, and the rule data of the rectangular block border of the block are developed in the print data buffer and then printed. Therefore, the rule of the block border which is based on a print state of the plural characters and symbols can be easily and precisely drawn. In addition, no ruling space is required for block border rules, and a block border rule having the size which is substantially equal to the size of the document data can be drawn.

In the document processing device as described above, the interlinear rule data preparation means calculates the interlinear boundary rule which is located between text print lines contained in the block and over a gap between right and left longitudinal rules of a block border, and develops the interlinear boundary rule data of the interlinear boundary rule into the print data buffer. The print means prints the interlinear boundary rule data on the print medium, together with the dot pattern data of the characters and symbols and the block border rules which are developed in the print data buffer.

In the document processing device as described above, the inter-character rule data preparation means calculates the inter-character boundary rule which is located between characters contained in the print lines and over a gap between upper and lower interlinear boundary rules, and develops the inter-character boundary rule data of the inter-character boundary rule into the print data buffer. The print means prints the inter-character boundary rule data on the print medium, together with the dot pattern data of the characters and symbols, the block border rules and the interlinear boundary rules which are developed in the print data buffer.

In the document processing device as described above, on the basis of the data stored in the input data storing means and the data of both left and right margins which are preset, the rule data preparation means prepares the rule data of a rectangular block border containing both right and left margins. Therefore, a block border rule having an excellent appearance can be drawn.

In the document processing device as described above, when plural blocks are provided to be adjacent to one another in the print direction, on the basis of the data stored in the input data storing means, the data of both the preset right and left margins and the data of an interblock margin, the rule data preparation means disposes a common longitudinal rule for two adjacent block borders at the center of the interblock margin in the print direction, and prepares the rule data of the block border so that the margins provided at both right and left end portions of each block are identical to each other. Therefore, characters and symbols which are printed in each block are disposed at the central portion of the block, so that a block border rule having excellent balance and appearance can be drawn.

BRIEF DESCRIPTION OF THE DRAWINGS

FIG. 4B is a table of labels for FIG. 4A;

FIG. 5B is a table of labels for FIG. 5A;

FIG. 6B is a table of labels for FIG. 6A;

FIG. 7B is a table of labels for FIG. 7A;

DETAILED DESCRIPTION OF THE PREFERRED EMBODIMENT

A preferred embodiment according to the invention will be described hereunder with reference to the accompanying drawings.

In this embodiment, the invention is applied to a tape-shaped label forming device for printing many characters, such as Hiragana characters, Kanji characters, alphabetic characters, numbers and symbols, on a laminate tape (print tape) serving as a print medium to form a tape-shaped label.

Figure 1:
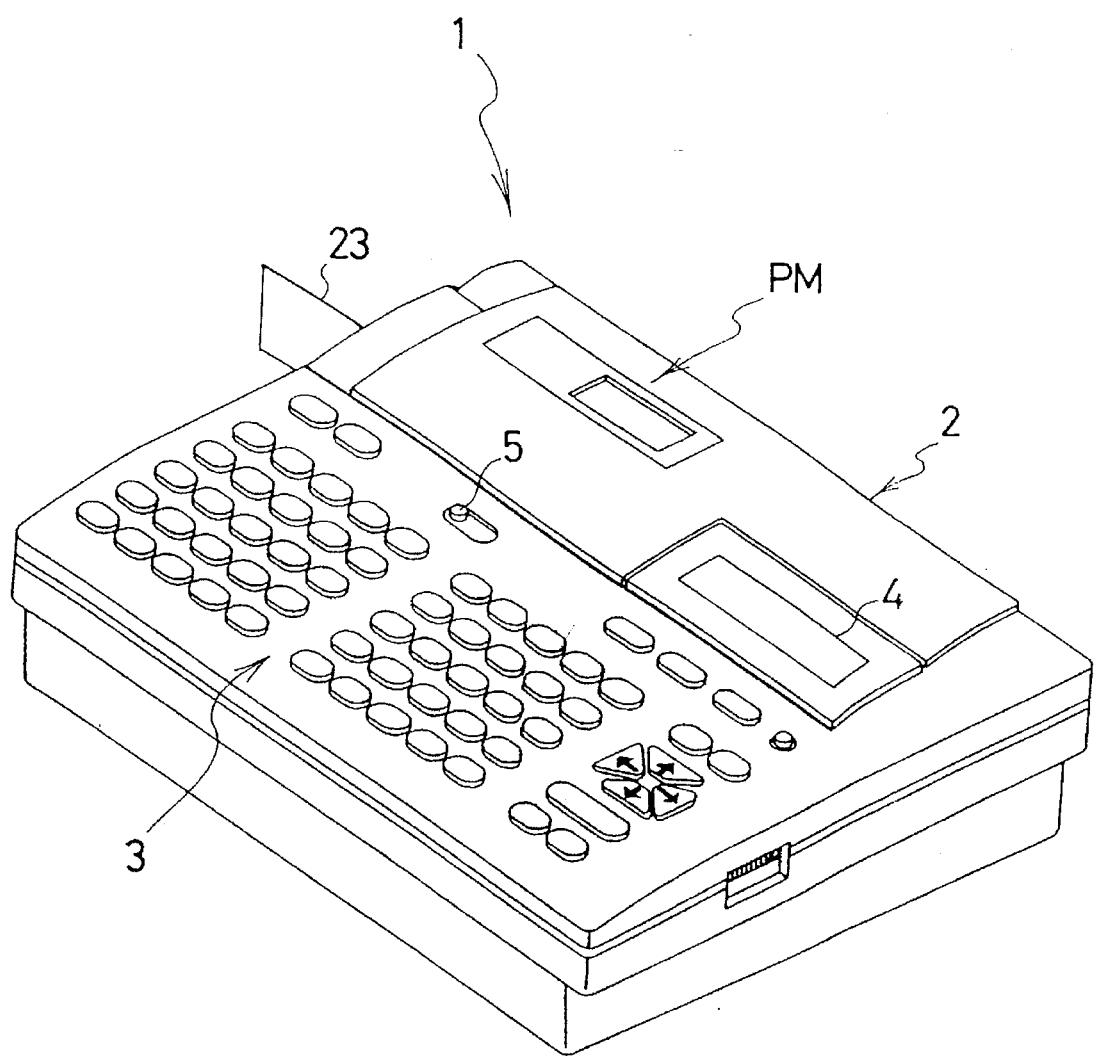
FIG. 1 is a perspective view showing a tape-shaped label forming device.

FIG. 1 shows a tape-shaped label forming device. The tape-shaped label forming device 1 includes a keyboard 3 disposed at the front portion of a body frame 2, a thermal print mechanism PM which is behind the keyboard 3 in the body frame 2, and a liquid crystal display 4 which is disposed just behind the keyboard 3 and can display input characters and symbols for two lines. Reference numeral 5 represents an operation lug for opening a cover case of the print mechanism PM.

The keyboard (corresponding to an input means) 3 is provided with not only character keys for inputting alphabetic characters, numbers, and symbols, but also editing keys, such as a space key, a line feed key, a block feed key, cursor shift keys for shifting a cursor and a block cursor in the right-and-left and up-and-down directions respectively, a format setting key for setting a print processing format, a rule setting key for setting a rule type, an executing key, a print key for instructing a print operation, and a power source key for turning on/off a power source.

Figure 2:
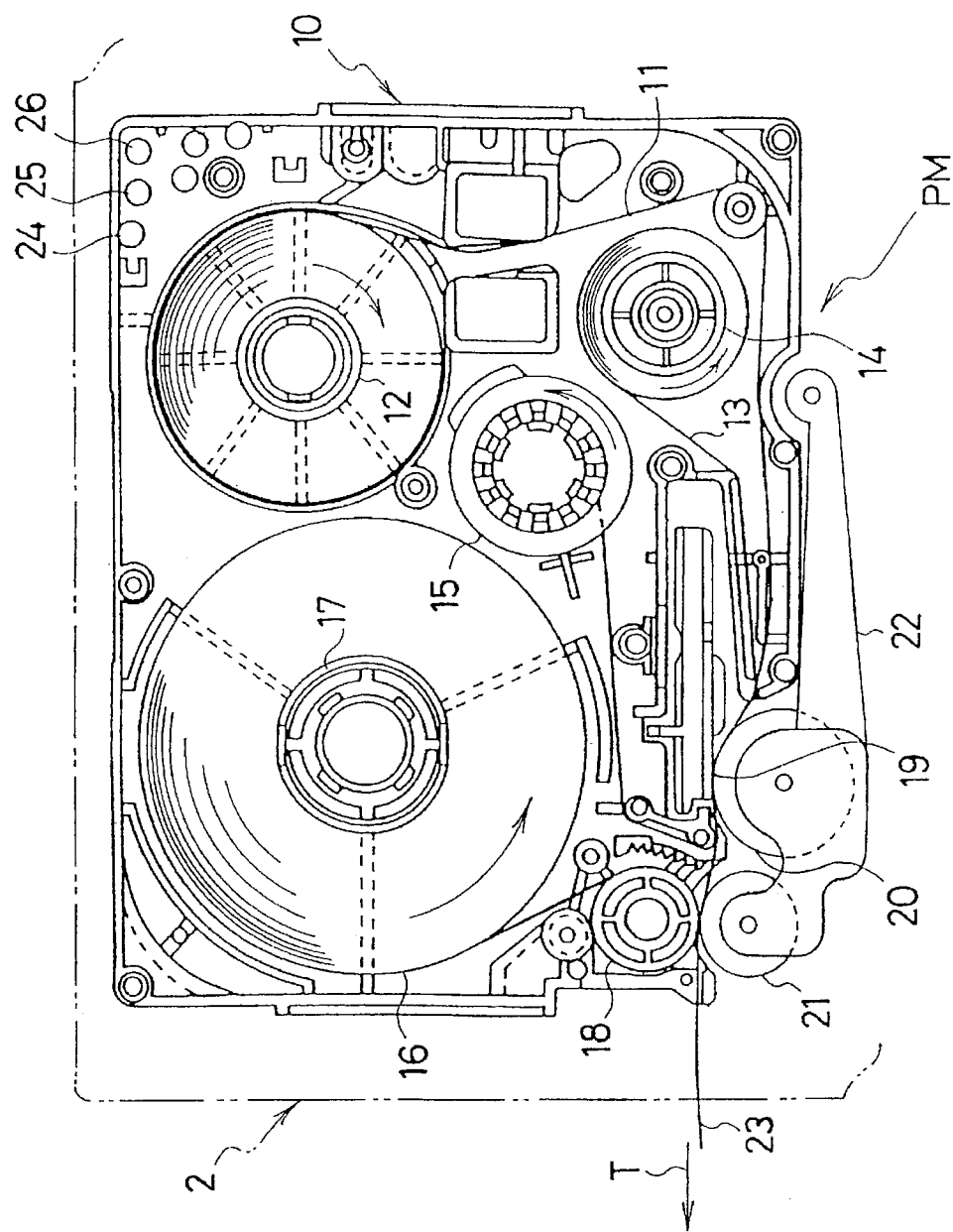
FIG. 2 is a plan view of a thermal print mechanism in which a tape cassette is loaded.

The thermal print mechanism (corresponding to print means) PM will be described with reference to FIG. 2. A rectangular tape cassette 10 is freely and detachably loaded in the thermal print mechanism PM. The tape cassette 10 includes a tape spool 12 around which a laminate tape 11 serving as a print target is wound, a ribbon spool 14 around which an ink ribbon 13 is wound, a ribbon take-up spool 15 for taking up the ink ribbon 13, a supply spool 17 around which a pressure sensitive adhesive double coated tape 16 (hereinafter referred to as "double coated tape") having the same width as the laminate tape 11 is wound with its peel-off sheet facing outwardly, and a bonding roller 18 for pressing the laminate tape 11 and the double coated tape 16 against each other so that the tapes are bonded to each other. The above spools 12, 14, 15, 17 and the roller 18 are freely and rotatably mounted in the tape cassette 10.

A thermal head 19 is disposed at the position where the laminate tape 11 and the ink ribbon 13 are overlapped with each other. A platen roller 20 for pressing the laminate tape 11 and the ink ribbon 13 against the thermal head 19 and a feed roller 21 for feeding the tapes while pressing the laminate tape 11 and the double coated tape 16 against the bonding roller 18 to form the tape-shaped label 23, are pivotally and rotatably supported by a roller supporter 22 which is pivotally and rotatably mounted on the body frame 2. The thermal head 19 has an array of 128 heating elements aligned along the thickness of the tape cassette 10.

Accordingly, by driving a tape feed motor 36 (see FIG. 3) in a prescribed rotational direction, the bonding roller 18 and the ribbon take-up spool 15 are rotated in respective prescribed rotational directions in synchronism with each other. Through this rotational motion of the roller 18 and the spool 15, characters and symbols are printed as a mirror image as a plurality of dot arrays at the back surface side of the laminate tape 11 when the plurality of heating elements of the thermal head 19 are supplied with current and the double coated tape 16 is bonded to the back surface side of the laminate tape 11, whereby a tape-shaped label 23 is formed. The tape-shaped label 23 thus formed is fed in a tape feed direction T to the outside of the body frame 2, as shown in FIGS. 1 and 2.

The thermal print mechanism PM is described in detail in U.S. Pat. No. 5,188,469. A detailed description of the thermal print mechanism PM thereof is omitted from the following description.

The tape cassette 10 can be one of five types, each type having a laminate tape of a different width. For example, the laminate tapes of the tape cassettes are designed to have a width of one of 6 mm, 9 mm, 12 mm, 18 mm and 24 mm. In association with the difference in the tape cassette type, three detection holes 24 to 26 are formed in the bottom wall portion of the tape cassette 10. Some of the detection holes 24 to 26 are selectively closed to identify the type of tape cassette 10 loaded therein. A cassette sensor 30 (see FIG. 3) for detecting a tape width, or a tape type, on the basis of the combination of closed detection holes (24 to 26) and for outputting the tape cassette information is secured to the body frame 2, which supports the lower side of the tape cassette 10.

Figure 3:
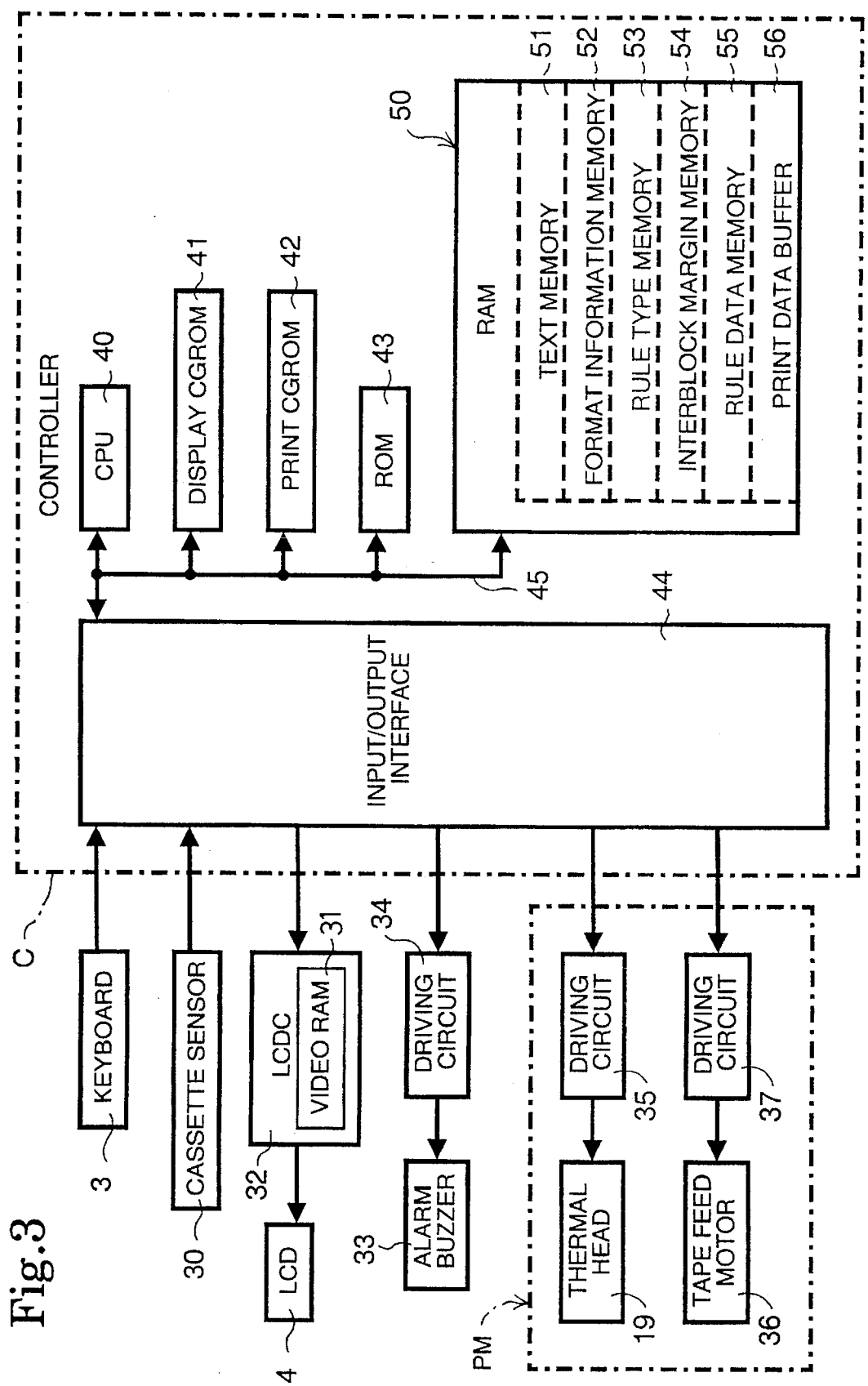
FIG. 3 is a block diagram showing a control system of the tape-shaped label forming device.
Figure 4A:
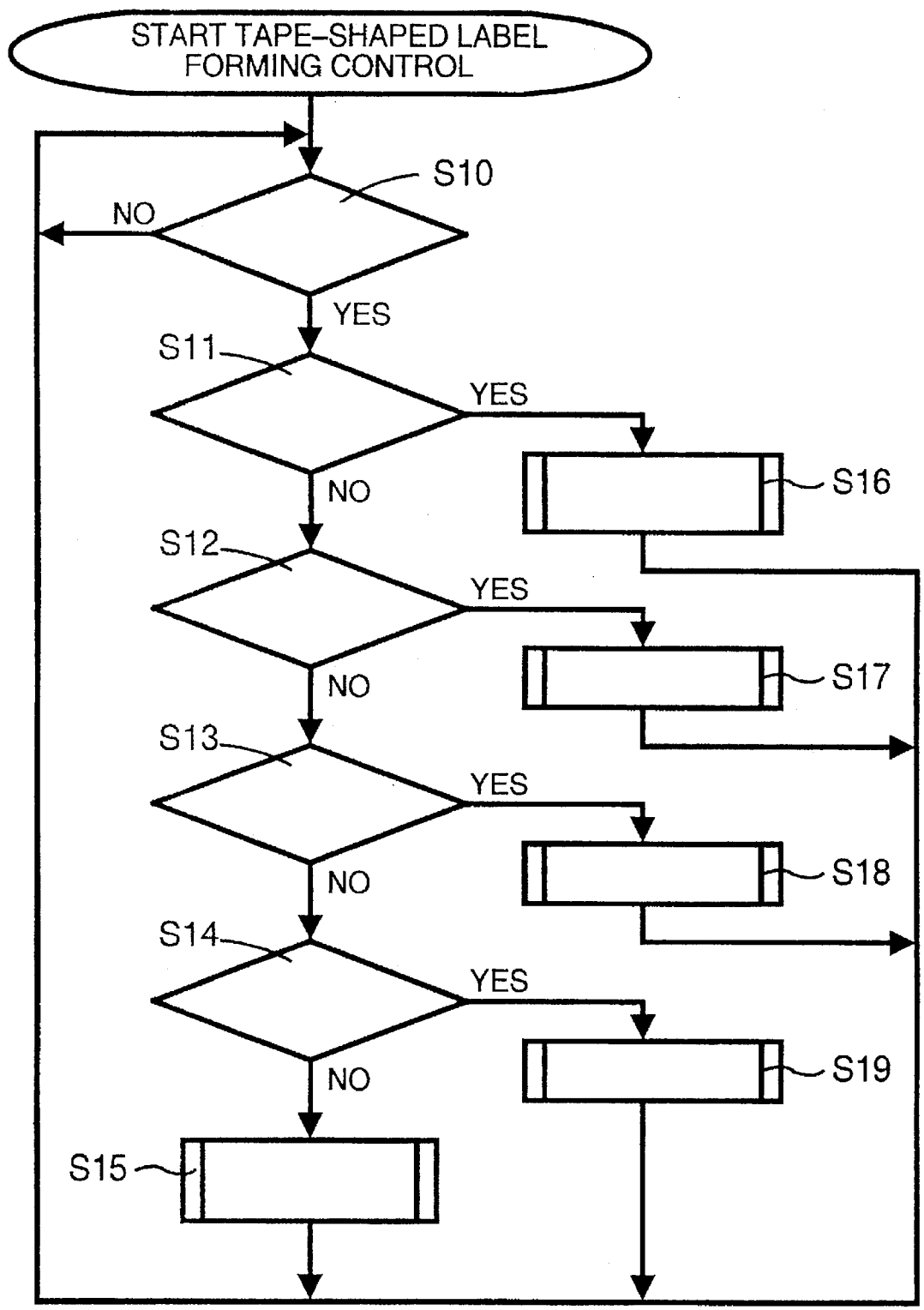
FIG. 4A is a flowchart for a routine of a tape-shaped label forming control.
Figure 5A:
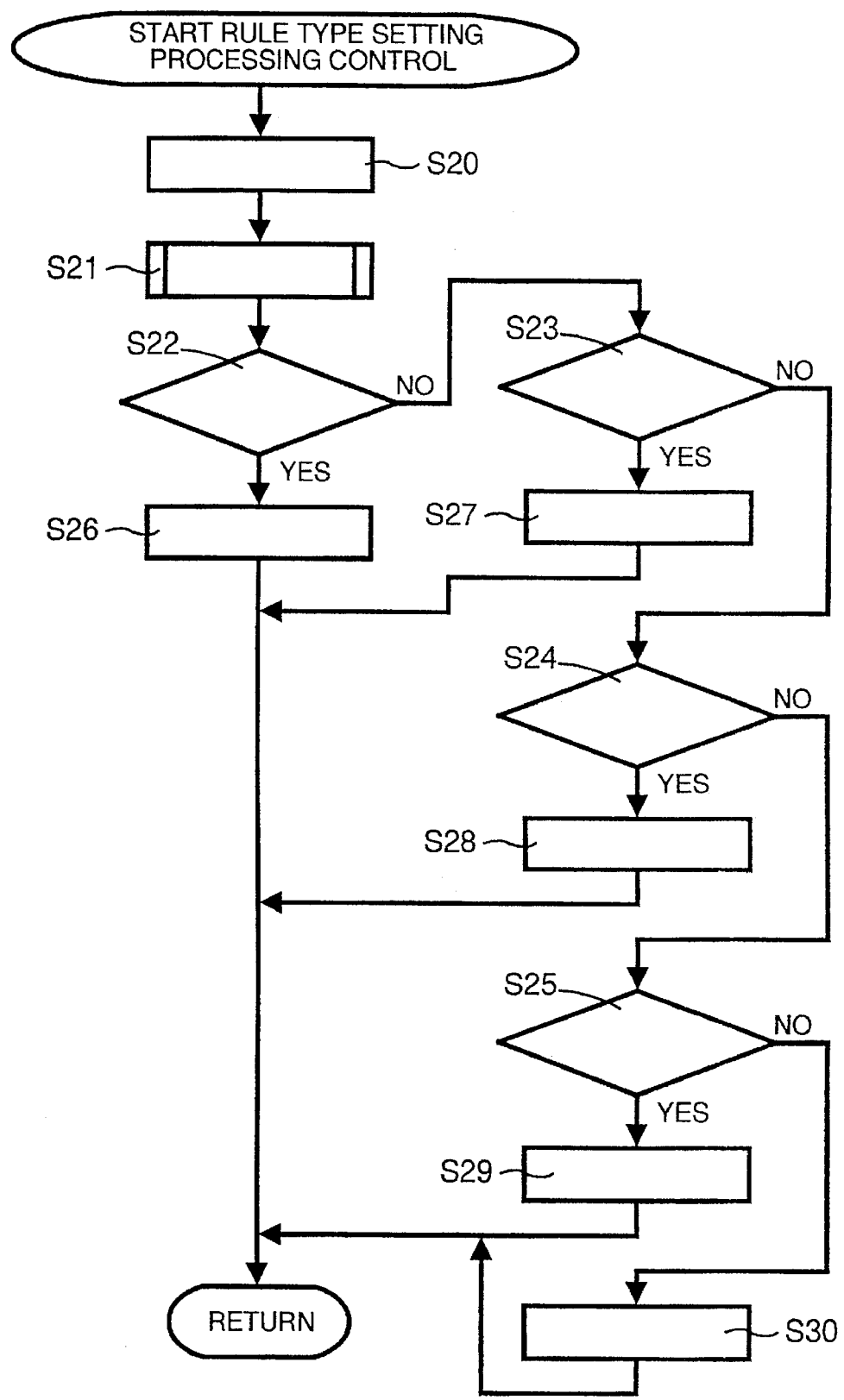
FIG. 5A is a flowchart for a routine of a rule type setting processing control.
Figure 6A:
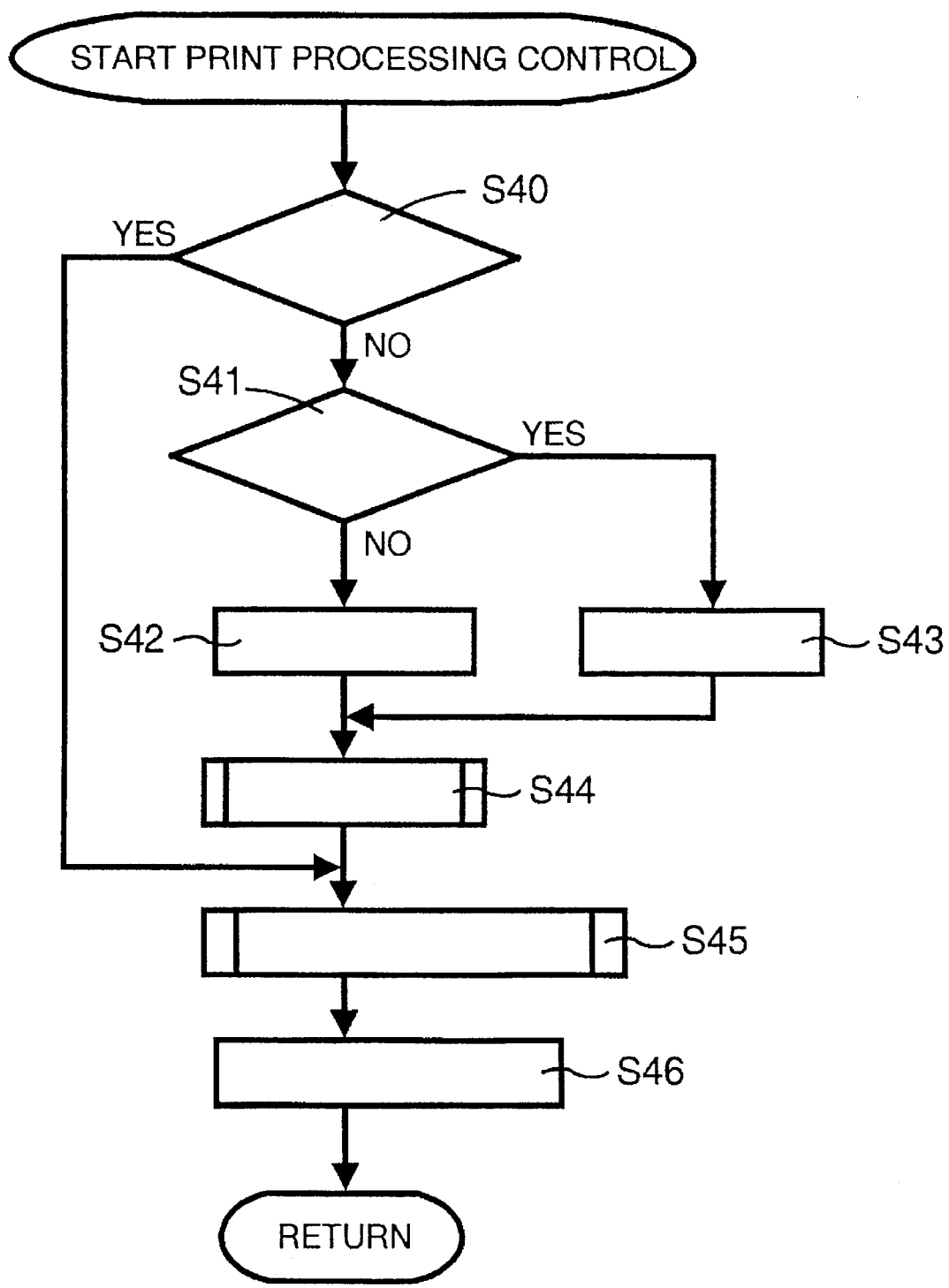
FIG. 6A is a flowchart for a routine of a print processing control.
Figure 7A:
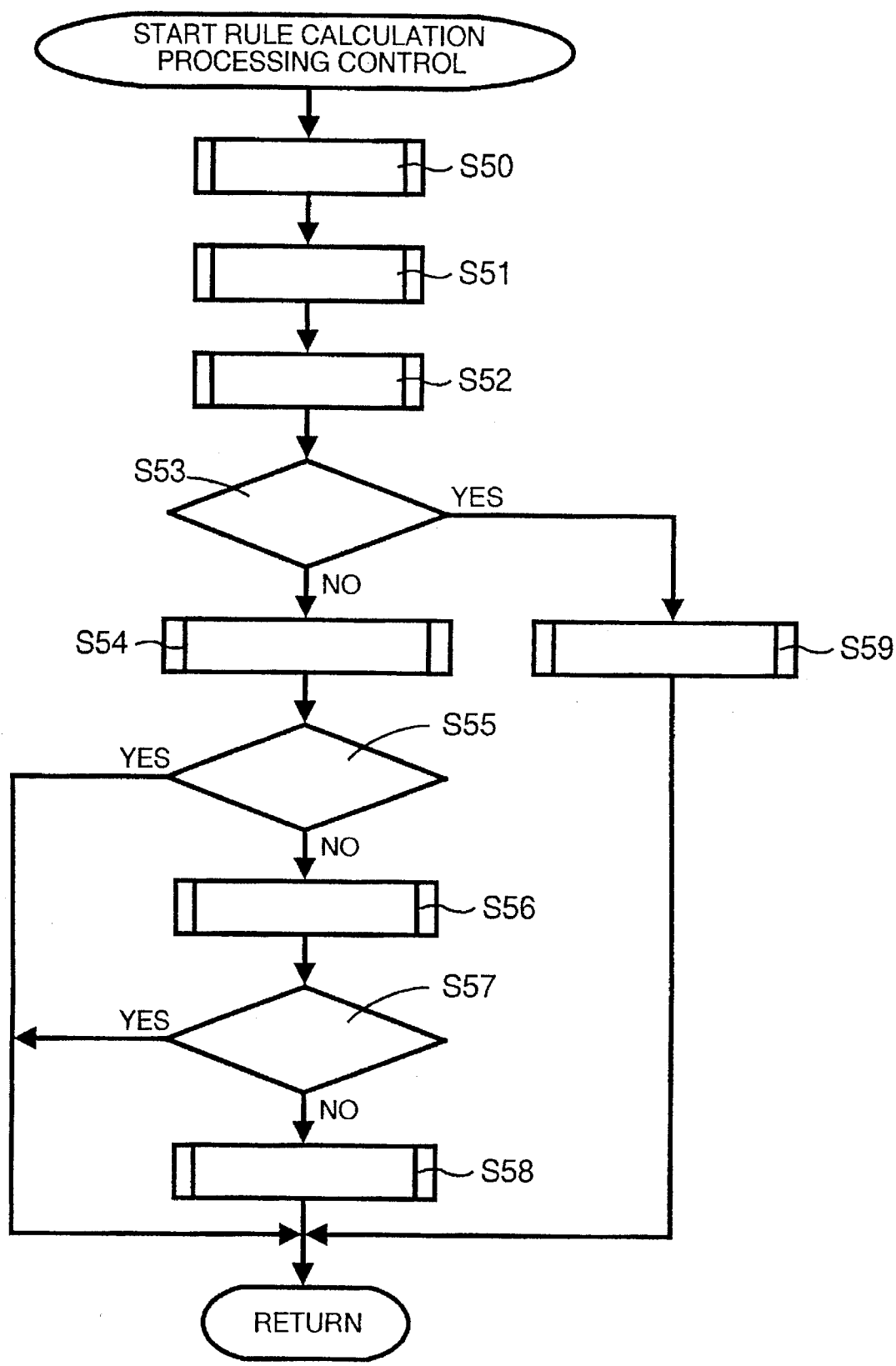
FIG. 7A is a flowchart of a routine of a rule calculation processing control.

A control system for the tape-shaped label forming device 1 is structured as shown in the block diagram of FIG. 3. An input/output interface 44 of a controller C is connected to the keyboard 3, the cassette sensor 30, a display controller (LCDC) 32 having a video RAM 31 for outputting display data to the liquid display (LCD) 4, a driving circuit 34 for an alarm buzzer 33, a driving circuit 35 for driving the thermal head 19, and a driving circuit 37 for driving the tape feed motor 36, respectively. The controller C comprises a CPU 40, the input/output interface 44 which is connected to the CPU 40 through a bus 45, such as a data bus, a display character generator ROM (display CGROM) 41, a print character generator ROM (print CGROM) 42, a ROM 43 and a RAM 50.

Stored in the display CGROM 41 are display dot pattern data, of a prescribed character size, for each of the many characters, such as alphabetic characters, numbers and symbols. Stored in the print CGROM 42 are print dot pattern data of a plurality of print character sizes for each of the many characters in correspondence to code data for every format.

Stored in the ROM 43 are a display driving control program for controlling the display controller 32 in correspondence to the code data of the characters, such as characters, numbers and symbols input from the keyboard 3, a print driving control program for successively transmitting dot pattern data of each dot array to be printed to the thermal head 19 and the tape feed motor 36 for printing, and a control program for a tape-shaped label forming control which is a feature of the invention and will be described later.

The RAM 50 is provided with a text memory 51 for storing the code data of characters input from the keyboard 3 as document data, a format information memory 52 for storing format information which is set for various format items, a rule type memory 53 for storing the set rule type data KD, an interblock margin memory 54 for storing data of a set interblock margin CM, a rule data memory 55 for storing calculated respective types of rule data, a print data buffer 56 for storing the dot pattern data corresponding to the character code stored in the text memory 51 and the rule data, and a memory and a buffer for temporarily storing calculation results which are obtained in the CPU 40.

Next, a tape-shaped label forming control routine, which is executed in the controller C of the tape-shaped label forming device 1, will be described with reference to the flowcharts and tables of labels of FIGS. 4A to 7B. In the following description, reference character Si (i=10, 11, 12, 13, ... ) represents a step.

When the power source key on the keyboard 3 is manipulated to turn on the power source, initialization is executed in the thermal print mechanism PM. Thereafter, a document data input frame is displayed on the display 4 and a label forming processing control is started. When a printable key, such as the line feed key or the block feed key, is manipulated in addition to the character keys or the numeral keys (S10, S11: Yes), a storage processing of storing the code data corresponding to the input key into the text memory 51 and a display processing of displaying the document data thereof on the display 4 are executed (S16), and then the program returns to S10.

Subsequently, when the format setting key is manipulated (S10: Yes, S11: No, S12: Yes), a format set frame is displayed. Accordingly, the cursor shift key is manipulated to execute format setting processing for setting desired values while displaying plural format setting items, such as a print character size, a format, and left and right margins. The set values for the respective format set items are stored in the format information memory 52 (S17), thereafter the program returns to step S10.

Figure 8:
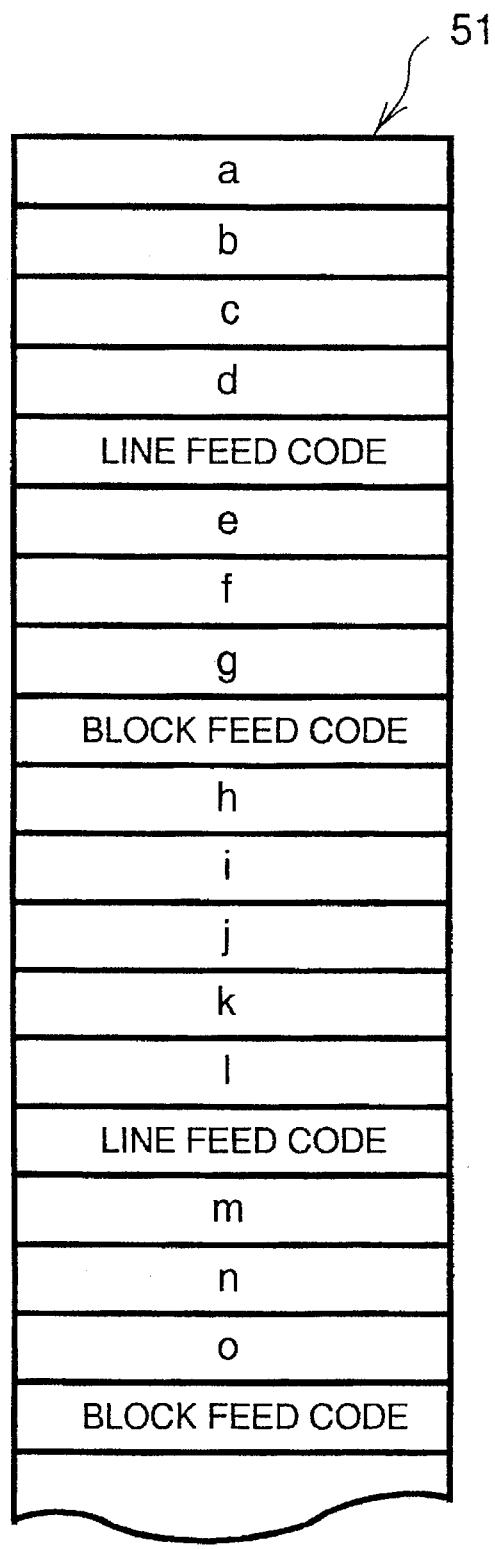
FIG. 8 is a diagram showing data stored in a text memory.

For example, character arrays of two lines, "abcd" and "efg", are stored as first block data in the text memory 51, and character arrays of two lines, "hijkl" and "mno" are stored as second block data in the text memory 51 as shown in FIG. 8. Further, for example, "3 mm" is stored as each of the left margin LM and the right margin RM in the format information memory 52.

Subsequently, if the rule setting key is manipulated to set a rule type (S10: Yes, S11,S12: No, S13: Yes), the a rule type setting processing control (see FIGS. 5A, 5B) is executed (S18).

Upon start of this control, a rule type selection frame is first displayed on the display 4 (S20). The rule type selection frame can cyclically display rule type names in the following order: "no rule", "outer border rule" for drawing a rectangular outer border to define the outline of document data, "block border rule" for drawing a rectangular block border to define the outline of each block, "first combination rule" for combining a block border rule and an interlinear boundary rule, and "second combination rule" for combining a block border rule, an interlinear boundary rule and an inter-character boundary rule. Therefore, the rule type setting processing for selecting a desired rule type is executed by manipulating the cursor up or down shift key (S21).

If the selected rule is "block border rule" (S22: Yes), "1" is set as the rule type data KD and stored in the rule type memory 53 (S26). Therefore, the control is finished, and the program returns to the step S10 of the tape-shaped label forming control.

If the selected rule is the "first combination rule" (S22: No, S23: Yes), "2" is set as the rule type data KD and stored in the rule type memory 53 (S27). If the selected rule is the "second combination rule" (S22, S23: No, S24: Yes), "3" is set as the rule type data KD and stored in the rule type memory 53 (S28). Further, if the selected rule is the "outer border rule" (S22 to S24: No, S25: Yes), "4" is set as the rule type data KD (S29). On the other hand, if the selected rule is the "no rule" (S22 to S25: No), "0" is set as the rule type data KD (S30). Next, if the print key is manipulated in the tape-shaped label forming control (S10: Yes, S11 to S13: No, S14: Yes), a print processing control (see FIGS. 6A, 6B) is executed (S19).

Upon start of this control, if the rule type data KD in the rule type memory 53 is "0", that is, it indicates the "no rule" (S40: Yes), the character array dot pattern data are developed into the print data buffer 56 (S45). On the other hand, if the rule type data KD in the rule type memory 53 is "4", that is, it indicates the "outer border rule" (S40: No, S41: Yes), the value of the left margin LM is set as the value of the interblock margin CM (S43). However, if the rule type data KD is any one of the values other than "0" and "4", that is, it is a "2" (block border rule), "2" (first combination rule) or a "3" (second combination rule) (S40, S41: No), a value which is twice as large as the left margin LM is set as the value of the interblock margin CM (S42).

Next, a rule calculation processing control (see FIGS. 7A, 7B) for forming rule data corresponding to the set rule type is executed (S44).

Upon the start of this control, a block border rule calculation for calculating a block border rule which is based on definition points for defining the size of a block border is first executed on an X-Y coordinate (S50).

Figure 9:
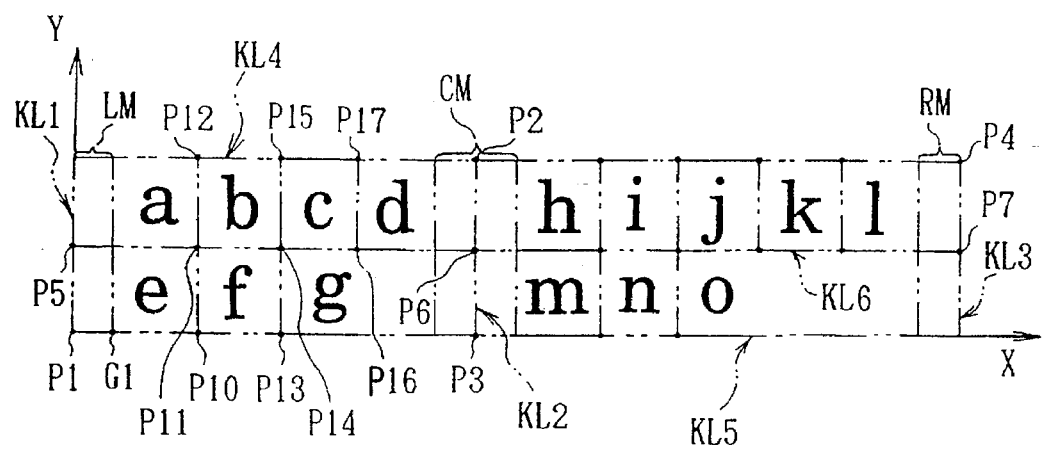
FIG. 9 is a diagram to obtain a block border, a interlinear boundary rule and a inter-character boundary rule.

For example, as shown in FIGS. 8 and 9, an upper end rule KL4 at a first (head) line and a lower end rule KL5 at a second (last) line are first calculated on the basis of data of plural blocks stored in the text memory 51, the set print character size, and the line arrangement data "left alignment". Then, an origin G1 to develop the block data is set as a head position on the lower end rule KL5. The left margin LM is added at the left side of the origin G1 to obtain a reference definition point P1 of the first block on the lower end rule LK5, and a line which passes the reference definition point P1 and is parallel to the Y-axis is obtained as a left end longitudinal rule KL1.

Next, a right end longitudinal rule KL2 which is parallel to the Y-axis is obtained by adding the maximum length of the first block of the first line with the half length of the interblock margin, and then a definition point P2 is obtained as an intersection point between the right end longitudinal rule KL2 and the upper end rule KL4 as shown in FIG. 9. With respect to the second block, a reference definition point P3 of the second block, a definition point P4 corresponding to the reference definition point P3 and the right end longitudinal rule KL3 of the second block are obtained. However, the left end longitudinal rule KL2 of the second block is common to the right end longitudinal rule KL2 of the first block. In this case, the left end longitudinal rule KL1 of the first block corresponds to a longitudinal rule at the left side of the first block and the right end longitudinal rule KL2 corresponds to a longitudinal rule at the right side thereof. Furthermore, the left end longitudinal rule KL2 of the second block corresponds to a longitudinal rule at the left side of the second block and the right end longitudinal rule KL3 corresponds to a longitudinal rule at the right side thereof. The obtained definition points P and the data on the rules KL are stored as rule data for a block border into the rule data memory 55.

Next, an interlinear boundary rule calculation for calculating an interlinear boundary rule between print lines which are contained in each block is executed (S51). For example, in FIG. 9, an interlinear boundary point P5 on the left end longitudinal rule KL1 (longitudinal rule at the left side) of the first block, an interlinear boundary point P6 on the right end longitudinal rule KL2 (longitudinal rule at the right side) of the first block, and an interlinear boundary point P7 on the right end longitudinal rule KL3 (longitudinal rule at the right side) of the second block are obtained. Furthermore, an interlinear boundary line KL6 which extends from the interlinear boundary point P5 through the interlinear boundary point P6 to the interlinear boundary point P7 is obtained. In this case, the interlinear boundary line KL6 corresponds to an interlinear boundary rule of the first and second blocks. The obtained definition points P and data on the rules KL are stored as the interlinear rule data in the rule data memory 55.

Next, an inter-character boundary rule calculation for calculating an inter-character boundary rule for characters between the print lines is executed (S52). For example, in FIG. 9, with respect to the first block, inter-character boundary points P10 to P12 between a first column character array "a,e" and a second column character array "b,f" are obtained on the lower end rule KL5, the interlinear boundary line KL6 and the upper end rule KL4, inter-character boundary points P13 to P15 between the second column character array "b,f" and a third column character array "c,g" are obtained, and further inter-character boundary points P16 to P17 between the third column character "c" and a fourth column character "d" are obtained. With respect to the second block, plural inter-character boundary points P (not shown) are obtained in the same manner as the first block. These obtained inter-character boundary points P are stored as inter-character rule data in the rule data memory 55.

If the rule type data KD is "4" (S53: Yes), rule data for an outer border comprising the left end longitudinal rule KL1, the right end longitudinal rule KL3, the upper end rule KL4 and the lower end rule KL5 of the block border rule data thus obtained are developed in the print data buffer 56 (S59). Thereafter, the control is finished and the program returns to S45 of the print processing control. However, if the rule type data KD is any one of the other values than "4", that is, any one of "1" to "3" (S53: No), the rule data of a block border comprising the left end longitudinal rule KL1, the right end longitudinal rule KL3, the upper end rule KL4, the lower end rule KL5 and the right end longitudinal rule KL2 which are obtained at S50 are developed in the print data buffer 56 (S54).

If the rule type data KD is "1" (S55: Yes), this control is finished and the program returns to step S45.

If the rule type data KD is "2" or "3" (S55: No) since it has been determined KD≠1 or 4, the data of the interlinear boundary rule comprising the interlinear boundary line KL6 obtained at step S51 are developed in the print data buffer 56, such data being common to both rule types. Thereafter, when the rule type data KD is determined to be "2" (S57: Yes), control is finished and the program returns to step S45.

On the other hand, if the rule type data is "3" (S57: No), the data of the inter-character boundary rule comprising the plural inter-character boundary points P obtained at step S52 are developed in the print data buffer 56 (S58) and control is finished. The program then returns to step S45.

Thereafter in the print processing control, on the basis of the data of the plurality of blocks stored in the text memory 51 and the set print character size, line arrangement data "left alignment", etc., the dot pattern data of the character array are developed in the print data buffer 56 while being overlapped with the rule data which have been already developed in the print data buffer 56. The dot pattern data are successively output to the thermal print mechanism PM every dot array and subjected to print processing (S46). Thereafter, the control is finished and the program returns to step S10.

Thereafter, if one of the keys other than the printable key, the format setting key, the rule setting key and the print key is manipulated in the tape-shaped label forming control (S10: Yes, S11 to S14: No), the processing corresponding to the manipulated key is executed (S15) and the program returns to step S10.

Figure 10:
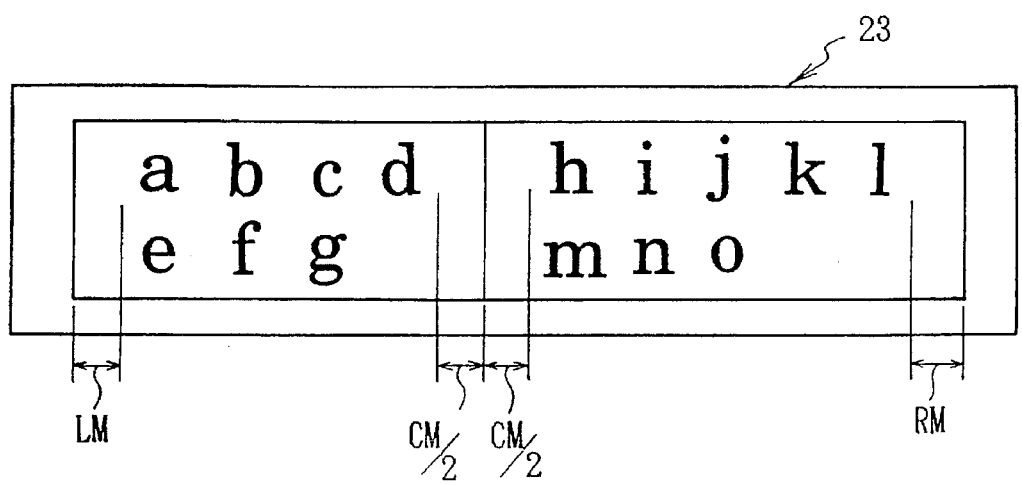
FIG. 10 is a diagram showing a print result in which a block border rule is drawn together with document data.
Figure 11:
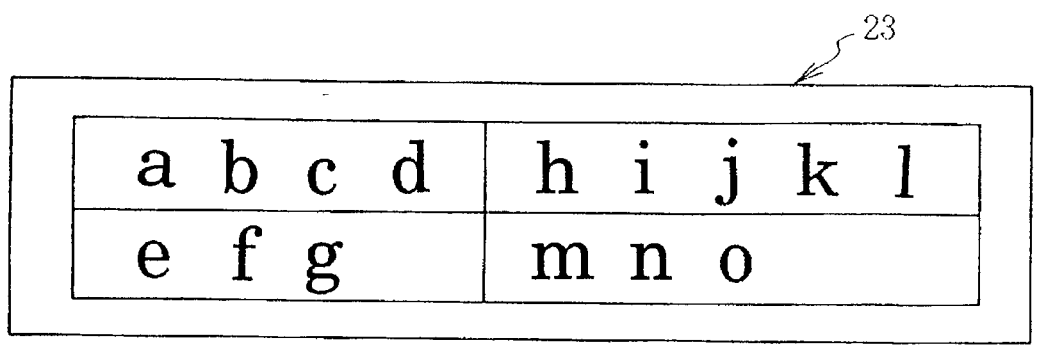
FIG. 11 is a diagram showing a print result in which an interlinear boundary rule is drawn together with document data and a block border rule.
Figure 12:
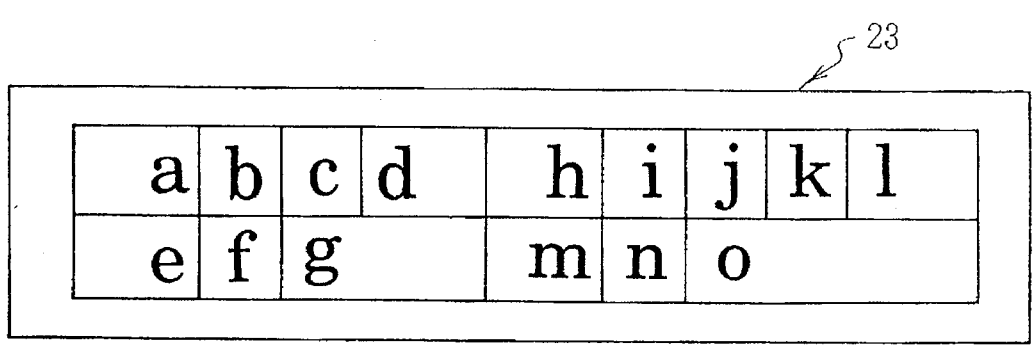
FIG. 12 is a diagram showing a print result in which an inter-character boundary rule is drawn together with document data, a block border rule and an interlinear boundary rule.

As a result of the print processing on the tape-shaped label 23, for example when the "block border rule" is set as the block type, the ruled lines of the block border for the first and second blocks are drawn as shown in FIG. 10 because the input document data comprise two blocks (see FIG. 8). At this time, the margin (left margin LM) at the left end portion of the first block is identical to the margin (interblock margin CM/2) at the right end portion thereof, and the margin (interblock margin CM/2) at the left end portion of the second block is identical to the margin (right margin RM) at the right end portion thereof. When the "first combination rule" is set as the block type, an interlinear boundary rule is drawn at the interlinear boundary between the first and second lines in addition to the block border rule as shown in FIG. 11.

Furthermore, when the "second combination rule" is set as the block type, inter-character boundary rules are drawn between characters on each print line in addition to the block border rule and the interlinear boundary rule.

An effect of the calculation and development of the data of the block border rule, the interlinear rule and the inter-character rule which are performed through the tape-label forming control of the invention will be hereunder described.

When the "block border rule" is set as the block type, the size of the first block and the second block is calculated for every block using the data of the characters, numbers and symbols found therein and the block feed code which are stored in the text memory 51. The rule data for the rectangular block borders thereof and the dot pattern data of the document data are developed into the print data buffer 56 and then subjected to the print processing. Therefore, the ruled lines for the block borders based on the print status of a plurality of characters and symbols can be drawn easily and more precisely. In addition, no ruling space is required for block border rules. Thus, a block border having substantially the same size as a document size can be drawn with block border rules.

At this time, on the basis of the data of the input data storing means and the preset data of both the right and left margins, the rule data of a rectangular block border containing both the right and left margins are prepared. The rule data of the block borders are prepared so that a common longitudinal rule for two adjacent block borders is disposed at the center of the interblock margin CM in the print direction, and the margins at the respective left and right end portions of the respective blocks are identical to each other. Therefore, characters and symbols which are printed in each block are disposed at the central portion of the block between both the right and the left end portions thereof. As a result, a block border rule having excellent balance and appearance can be drawn.

Furthermore, when the "first combination rule" is set as the block type, an interlinear boundary rule, which is an interlinear boundary rule between text print lines which are contained in each of the first and second blocks, is positioned between the right and left longitudinal rules of each block border. The interlinear boundary rule data thereof and the dot pattern data of the document data are developed into the print data buffer 56 and subjected to the print processing. Therefore, in addition to the characters, numbers and symbols and the block border rule, the interlinear boundary rule is printed on the tape-shaped label 23 so that the interlinear boundary rule can be simply drawn in addition to the block border rule. In this case, the characters and symbols which are printed in each block are also disposed at the center portion of the block between the margins at the right and the left end portions thereof. Thus, a block border rule having excellent balance and appearance can be drawn.

When the "second combination rule" is set as the block type, an inter-character boundary rule which is located between characters contained in each print line of each of the first and second blocks so as to extend over a gap between the upper and lower interlinear boundary rules is obtained. The data of the inter-character boundary rule and the dot pattern data of the document data are developed into the print data buffer 56 and subjected to the print processing. Therefore, in addition to the characters, numbers and symbols, the block border rule and the interlinear boundary rules, the inter-character boundary rules are printed on the tape-shaped label 23 so that the inter-character boundary rule can be simply drawn in addition to the block border rule and the interlinear boundary rule. At this time, the characters, numbers and symbols which are printed in each block are also disposed at the central portion of the block so that the block border rule can be drawn with excellent balance and appearance.

The invention is not limited to the above embodiment. Various modifications can be made on the basis of existing techniques or techniques which are obvious to persons skilled in the art. For example, in place of use of the ink ribbon 13, the printing may be performed on a print tape formed of a heat sensitive sheet. Furthermore, the size of the interlinear boundary rule or the inter-character boundary rule may be variable relative to the size of the block border rule. The rule type is not limited to only a "solid line", but it may be selected from various line types, such as "dotted line", "broken line", and "two-dotted chain line".

Further, the invention is applicable to various document processing devices each of which includes a keyboard, a CRT type display, and a print mechanism.

According to the first aspect of the invention, the document processing device includes the input means, the apply means, the input data storing means and the control means, and further includes the block indication means and the block border rule data preparation means. In this document processing device, on the basis of the data of characters, numbers and symbols and the block indication data which are stored in the input data storing means, the size of a block is calculated for every block, and the ruled data of a rectangular block border is developed in the print data buffer and then printed, so that the block border rule based on the print state of the plural characters and symbols can be drawn simply and precisely. In addition, no ruling space is required for the block border rule, so that a block border having substantially the same size as the basic document data can be drawn with a block border rule.

According to the document processing device as described above, the interlinear rule data preparation means is further provided to calculate an interlinear boundary rule which is located between print lines contained in the block and between the right and left longitudinal rules of the block border, and to develop the data of the interlinear boundary rule into the print data buffer. Therefore, the interlinear boundary rule data can be printed on the print medium together with the dot pattern of the characters and symbols and the block border rule by the print means, so that the interlinear boundary rule can be simply drawn together with the block border rule.

According to the document processing device as described above, the inter-character rule data preparation means is further provided to calculate an inter-character boundary rule which is located between characters contained in the print line and also between the upper and lower interlinear boundary rules, and develop the inter-character boundary rule data into the print data buffer. Therefore, the inter-character boundary rule data are printed on the print medium by the print means, together with the dot pattern data of the characters and symbols, the block border rule and the interlinear boundary rules which are developed in the print data buffer, so that the inter-character boundary rule can be simply drawn together with the block border rule and the interlinear boundary rule.

According to the document processing device as described above, the rule data preparation means prepares the rule data of the rectangular block border containing the right and left margins on the basis of the data of the input data storing means and the data of the preset right and left margins, so that the block border rule having an excellent appearance can be drawn between both the right and left margins.

According to the document processing device as described above, when a plurality of blocks are adjacent to one another in the print direction, on the basis of the data of the input storing means, the data of the preset right and left margins and the interblock margin data, the rule data preparation means prepares the block border rule data so that the common longitudinal rule of two adjacent blocks is disposed in the center of the interblock margin in the print direction, and the margins at the right and left end portions of each block are identical to each other. Therefore, the characters and symbols which are printed in each block are disposed at the central portion of the block and the block border rule having excellent balance and appearance can be drawn.

What is claimed is:

1. A document processing device, comprising:
   input means for inputting various data and instructions;
   input data storage means for storing input data of characters and symbols;
   a print buffer for storing print data;
   control means for controlling said input means, said display means and said print means;
   block indication means for inputting, from said input means, block indication data which are indicated as a block for each array of plural characters and symbols at a data input time, and storing the block indication data into said input data storage means while being incident to the data of the plural characters and symbols of the block; and
   block border rule data preparation means for calculating a block size for every block indicated by the block indication means using the data of said input data storing means, and developing block border rule data for a rectangular block border into said print data buffer.

2. The document processing device as claimed in claim 1, further comprising interlinear rule data preparation means for calculating an interlinear boundary rule which is located between print lines contained in the block and extending between right and left longitudinal rules of a block border, and developing interlinear boundary rule data for the interlinear boundary rule into said print data buffer.

3. The document processing device as claimed in claim 2, further comprising inter-character rule data preparation means for calculating an inter-character boundary rule which is located between characters contained in the print lines and extending between upper and lower interlinear boundary rules, and developing the inter-character boundary rule data of the inter-character boundary rule into said print data buffer.

4. The document processing device as claimed in claim 1, wherein when plural blocks are provided to be adjacent to one another in a print direction, on the basis of the data stored in said input data storing means and the data of both left and right margins which are preset, said rule data preparation means prepares the rule data of a rectangular block border containing both the right and left margins.

5. The document processing device as claimed in claim 1, wherein when plural blocks are provided to be adjacent to one another in a print direction, on the basis of the data stored in said input data storing means, the data of both the preset right and left margins and the interblock margin data, said rule data preparation means disposes a common longitudinal rule of two adjacent block borders at the center of the interblock margin in the print direction, and prepares the rule data of the block border so that the margins provided at both right and left end portions of each block are identical to each other.

6. The document processing device as claimed in claim 1, further comprising a non-volatile memory containing a plurality of ruled line types.

7. The document processing device as claimed in claim 6, wherein the block indication data input by said block indication means comprises selecting one of said ruled line types.

8. The document processing device as claimed in claim 1, further comprising print means for printing on a print medium the print data stored in the print buffer.

9. A data processing device, comprising:
   input means for inputting character data and instructions as input data;
   a text memory for storing the input data;
   a non-volatile memory containing a plurality of ruled line types;
   ruled line type selection means for selecting one of the ruled line types;

a display for displaying representations of the input data;

a print memory for storing print data;

ruled line preparation means for preparing ruled lines for printing with the character data based upon the input data; and a controller for controlling the operation of the other elements.

10. The data processing device as claimed in claim 9, wherein said non-volatile memory stores at least three ruled line types.

11. The data processing device as claimed in claim 10, wherein ruled line types include a no ruled line type, a ruled border line type, a ruled block border line type, and an interlinear ruled line type in combination with one of the ruled border line and the ruled block border line types.

12. The data processing device as claimed in claim 11, wherein the ruled line types further include an inter-character ruled line type used in combination with the interlinear ruled line type.

13. The data processing device as claimed in claim 12, wherein said ruled line preparation means prepares inter-character ruled lines positioned mid-way between opposing side edges of adjacent characters within a block.

14. The data processing device as claimed in claim 11, wherein said ruled line preparation means includes block border ruled line setting means for setting a ruled line as a boundary between a last character positioned in one block and a first character positioned in a following, adjacent block.

15. The data processing device as claimed in claim 14, wherein said boundary is mid-way between a defining edge of the last character in the one block and an opposing defining edge of the first character in the following, adjacent block.

16. The data processing device as claimed in claim 14, wherein said input means includes means for setting margin data and a distance from the boundary ruled line to the edge of each defining character is equal to the set margin data.

17. The data processing device as claimed in claim 11, wherein said ruled line preparation means includes means for creating a ruled line mid-way between opposing edges of adjacent text print lines.

18. The data processing device as claimed in claim 9, wherein said input means includes means for setting left and right margin data.

19. The data processing device as claimed in claim 9, further comprising a print element.

20. The data processing device as claimed in claim 19, further comprising a working memory wherein said ruled line preparation means creates data for the location of ruled border lines, ruled block border lines, interlinear ruled lines, and inter-character ruled lines on the basis of the input data and stores the ruled line data in said working memory.

21. The data processing device as claimed in claim 20, wherein upon selection of the ruled line type by said ruled line type selection means, appropriate parts of the ruled line data stored in said working memory are converted to print data and stored in said print memory for printing with the character data.

22. The data processing device as claimed in claim 9, wherein the ruled line preparation means prepares at least one of ruled border lines, ruled block border lines, interlinear ruled lines, and inter-character ruled lines based upon the input data.

* * * * *